US012789196B2

(12) United States Patent
Niklewski et al.

(10) Patent No.: US 12,789,196 B2
(45) Date of Patent: Nov. 10, 2026

(54) CRUSHER DEVICE COMPRISING AN OVERLOAD SAFETY DEVICE

(71) Applicant: Metso USA Inc., Brookfield, WI (US)

(72) Inventors: Andrzej Niklewski, Sao Paulo (BR); Paulo Barscevicius, Sao Paulo (BR)

(73) Assignee: Metso USA Inc., Brookfield, WI (US)

( * ) Notice: Subject to any disclaimer, the term of this patent is extended or adjusted under 35 U.S.C. 154(b) by 449 days.

(21) Appl. No.: 17/380,541

(22) Filed: Jul. 20, 2021

(65) Prior Publication Data

US 2022/0023873 A1 Jan. 27, 2022

Related U.S. Application Data

(63) Continuation of application No. 15/753,795, filed as application No. PCT/IB2016/054966 on Aug. 19, 2016, now Pat. No. 11,097,284.

(51) Int. Cl.

| | |
|---|---|
| ***B02C 25/00*** | (2006.01) |
| ***B02C 2/04*** | (2006.01) |
| ***B02C 2/06*** | (2006.01) |

(52) U.S. Cl.

CPC .............. *B02C 25/00* (2013.01); *B02C 2/047* (2013.01); *B02C 2/06* (2013.01)

(58) Field of Classification Search

CPC .... B02C 2/04; B02C 2/42; B02C 2/47; B02C 25/00; B02C 23/04

See application file for complete search history.

(56) References Cited

U.S. PATENT DOCUMENTS

| | | | | |
|---|---|---|---|---|
| 3,384,312 A | | 5/1968 | Patterson et al. | |
| 3,801,026 A | * | 4/1974 | Decker | B02C 2/047 241/211 |
| 3,873,037 A | * | 3/1975 | Decker | B02C 2/047 241/211 |

(Continued)

FOREIGN PATENT DOCUMENTS

| | | |
|---|---|---|
| EP | 1843851 A1 | 10/2007 |
| RU | 2452571 | 6/2012 |

(Continued)

OTHER PUBLICATIONS

International Search Report and Written Opinion for International Application No. PCT/IB2016/054966 dated Oct. 11, 2016.

(Continued)

*Primary Examiner* — Christopher L Templeton
*Assistant Examiner* — P Derek Pressley
(74) *Attorney, Agent, or Firm* — Andrus Intellectual Property Law, LLP

(57) ABSTRACT

A crusher device such as a cone or gyratory crusher is disclosed. The crusher device includes a shaft defining a first direction parallel to its length. The shaft includes an upper shaft end, a crusher head, and an overload safety device that couples the crusher head to the upper shaft end. The overload safety device includes a biasing device configured to bias the crusher head away from the upper shaft end in the first direction. The overload safety device is configured to permit displacement of the crusher head along the first direction relative to the shaft in response to a force acting on the crusher head in the first direction.

6 Claims, 4 Drawing Sheets

(56) References Cited

U.S. PATENT DOCUMENTS

| | | | | | |
|---|---|---|---|---|---|
| 4,060,205 | A * | 11/1977 | Pollak | B02C 2/047 241/290 |
| 4,339,087 | A | 7/1982 | Pollak | |
| 2006/0144979 | A1 * | 7/2006 | Nieminen | B02C 2/047 241/259 |
| 2009/0256015 | A1 * | 10/2009 | Torres | B02C 2/047 241/207 |

FOREIGN PATENT DOCUMENTS

| | | | |
|---|---|---|---|
| RU | 2508942 | | 3/2014 |
| WO | 2005102530 | A1 | 11/2005 |
| WO | 2014135306 | | 9/2014 |

OTHER PUBLICATIONS

International Preliminary Report on Patentability for International Application No. PCT/IB2016/054966 dated Nov. 8, 2017.
Official Action for Russian Patent Application No. 2018109498 dated Nov. 23, 2018.
Office Action for Canadian Patent Application No. 2,996,254 dated Dec. 20, 2018.
Decision of Grant for corresponding Russian Patent Application No. 2018109498 dated Mar. 28, 2019.

* cited by examiner

CRUSHER DEVICE COMPRISING AN OVERLOAD SAFETY DEVICE

CROSS REFERENCE TO RELATED APPLICATION

The present application is a continuation of U.S. patent application Ser. No. 15/753,795, filed Feb. 20, 2018, now issued as U.S. Pat. No. 11,097,284, which application is the U.S. national stage application of International Application PCT/IB2016/054966 filed Aug. 19, 2016, which international application was published on Mar. 2, 2017, as International Publication WO 2017/033104 in the English language. The International Application claims priority of European Patent Application 15182028.9, filed Aug. 21, 2015.

FIELD OF THE INVENTION

The present invention relates to an overload safety device for use in a gyratory crusher or cone crusher.

Cone crushers and gyratory crushers are two types of rock crushing systems, which generally break apart rock, stone or other material in a crushing gap between a stationary element and a moving element. A cone or gyratory crusher is comprised of a head assembly including a crusher head that gyrates about a vertical axis within a stationary bowl attached to a main frame of the rock crusher. The crusher head is assembled surrounding an eccentric that rotates about a fixed shaft to impart the gyrational motion of the crusher head which crushes rock, stone or other material in a crushing gap between the crusher head and the bowl. The eccentric can be driven by a variety of power drives, such as an attached gear, driven by a pinion and countershaft assembly, and a number of mechanical power sources, such as electrical motors or combustion engines.

The gyrational motion of the crusher head with respect to the stationary bowl crushes rock, stone or other material as it travels through the crushing gap. The crushed material exits the cone crusher through the bottom of the crushing gap.

Typically, gyratory crushers and cone crushers are provided with spider arms. These spider arms protect the crusher head from damage caused by large impacts from materials being dropped on to the crusher head. For example, WO 2014/135306 A1 discloses a gyratory crusher spider arm shield. However, such spider arms reduce the intake capability of the crusher.

Accordingly, there is a need to reduce the number of spider arms or completely eliminate the need for spider arms.

There is also a need to better handle overload of material to be crushed such that non-crushable material such as tramp material can pass through the device. Overload may refer to the overloading of crushable material and/or to the loading of non-crushable material.

SUMMARY OF THE INVENTION

According to the present invention, there is provided a crusher device such as a cone or gyratory crusher. The crusher device comprises a shaft; a crusher head; and an overload safety device. The shaft defines a first direction parallel to its length. The shaft comprises an upper shaft end. The overload safety device couples the crusher head to the upper shaft end. The overload safety device comprises a biasing device configured to bias the crusher head away from the upper shaft end in the first direction. The overload safety device is configured to permit displacement of the crusher head along the first direction relative to the shaft in response to a force acting on the crusher head in the first direction.

In this disclosure, the force acting on the crusher head in the first direction may result from any force acting on the crusher head with a force component which acts in the first direction.

With such a configuration, it is possible to protect the crusher head from damage caused by large impacts from materials dropped on to the crusher head. This configuration is particularly advantageous in a spiderless crusher device or a crusher device with a reduced number of spider arms such that the intake capability of the crusher can be increased.

Also, with the above configuration it is possible to better handle overload of material to be crushed such that non-crushable material such as tramp material can pass through the device.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawing, where the same reference numerals will be used for similar elements, wherein.

DETAILED DESCRIPTION

Figure 1:
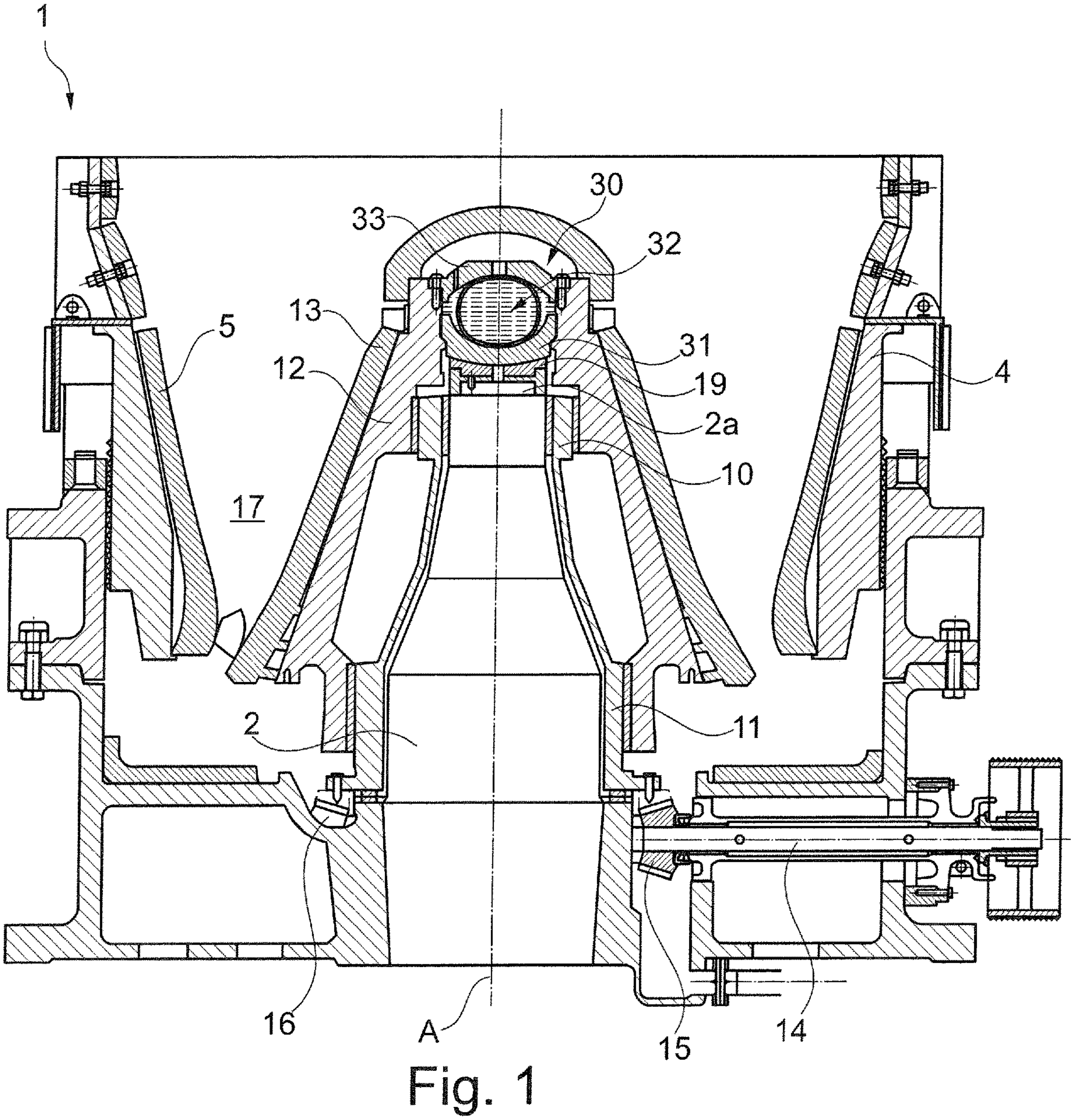
FIG. 1 shows schematically a gyratory crusher according to an embodiment of the present invention.

FIG. 1 schematically illustrates a gyratory crusher 1 in section. The gyratory crusher 1 has a vertical shaft 2 and a frame 4. The shaft 2 has a longitudinal axis defining a first direction coinciding with a central axis A of the crusher.

An upper and a lower eccentric ring 10, 11 of an eccentric assembly are rotatably supported about the shaft 2 by means of two rotational shaft bearings such as rotational slide bushings. The eccentric of the crusher could, however, also include a single eccentric element having a continuously eccentric shape along its axial extension, as it is the case with many crushers known in the art.

A crusher head 12 is radially supported by and rotatable about the eccentric rings 10, 11 via another pair of rotational bearings, such as another pair of rotational slide bushings. Together, the shaft bearings and the head bearings form an eccentric bearing arrangement for guiding the crusher head 12 along a gyratory path.

A drive shaft 14 is connected to a drive motor and is provided with a pinion 15. The drive shaft 14 is arranged to rotate the lower eccentric ring 11 by the pinion 15 engaging a gear rim 16 mounted on the lower eccentric ring 11. When the drive shaft 14 rotates the lower eccentric ring 11, during operation of the crusher 1, the crusher head 12 mounted thereon will execute a gyrating movement.

An inner crushing shell or mantle 13 is mounted on the crusher head 12. An outer crushing shell or bowl 5 is mounted on the frame 4. A crushing gap 17 is formed between the two crushing shells 13, 5. When the crusher 1 is operated, material to be crushed is introduced in the crushing gap 17 and is crushed between the mantle and the bowl 5 as a result of the gyrating movement of the crusher head 12, during which movement the mantle 13 approaches the bowl along a rotating generatrix and moves away therefrom along a diametrically opposed generatrix.

The crusher head 12 is supported on a free upper end bearing 19 provided at a free upper end 2*a* of the shaft 2 by an overload safety device 30. The overload safety device 30 comprises a top element 33 affixed to an extended part 12*a* (cf. FIG. 2) of the crusher head 12 such that movement of the crusher head 12 in the first direction results in a corresponding movement of the top element 33 of the overload safety device 30 in the first direction. The overload safety device 30 comprises a joint 31 which is rotatably received in the free upper end bearing 19 and a biasing device 32 disposed between the joint 31 and top element 33. The biasing device 32 acts to bias the joint 31 and top element 33 away from each other such that the crusher head 12 is biased away from the shaft 2.

The head bearings permit the crusher head 12 to displace in the first direction relative to the eccentric, i.e. in the present embodiment the eccentric rings 10, 11. The overload safety device 30 permits displacement of the crusher head 12 along the first direction relative to the shaft 2 in response to a force acting on the crusher head 12 in the first direction. The biasing device 32 is configured to return the crusher head 12 to an equilibrium position when a constant force is applied to the crusher head 12.

Impacts on the crusher head 12 from materials being dropped on to the crusher head 12 result in the crusher head 12 being displaced along the first direction towards the shaft 2. With such a configuration it is possible to protect the crusher head 12 from damage caused by large impacts from materials being dropped on to the crusher head 12.

If the load acting on to the crusher head 12 is released, the biasing device 32 of the overload safety device 30 returns the crusher head 12 to an equilibrium position. With such a configuration the crusher head 12 recovers from impacts such that it may once again be displaced towards the shaft 2 in response to any further impacts.

In the event that non-crushable material is fed into the crushing gap 17, the overload safety device 30 allows the crusher head 12 to displace along the first direction towards the shaft 2 such that the distance between the two crushing shells 13, 5 increases to thereby allow the non-crushable material to pass through the crushing gap 17. With such a configuration, the crusher 1 is better able to handle overload of material to be crushed such that non-crushable material such as tramp material can pass through the device if it is fed into the crushing gap 17. Once the non-crushable material passes through the crushing gap 17 the biasing device 32 of the overload safety device 30 returns the crusher head 12 to an equilibrium position.

The overload safety device 30 depicted in FIG. 1 is a bladder accumulator overload safety device which is further described hereinbelow. However, the overload safety device 30 may comprise any form of biasing device capable of biasing the crusher head 12 away from the upper free end 2*a* of the shaft 2. Non-limiting examples of suitable biasing devices for use in an overload safety device according to the present invention are bladder accumulators; piston accumulators; diaphragm accumulators; and springs.

Optionally, the overload safety device can be configured to provide a "soft return" of the crusher head from a displaced position. In other words, the overload safety device can be configured to dampen the return of the crusher head 12 from the displaced position to an equilibrium position, so that the return is effected more slowly than the swift and sudden displacement to which the crusher head 12 is subject upon an impact. Hydraulic damping, frictional resistance damping and magnetic damping are non-limiting examples of the types of damping suitable for use in an overload safety device according to the present invention.

Figure 2:
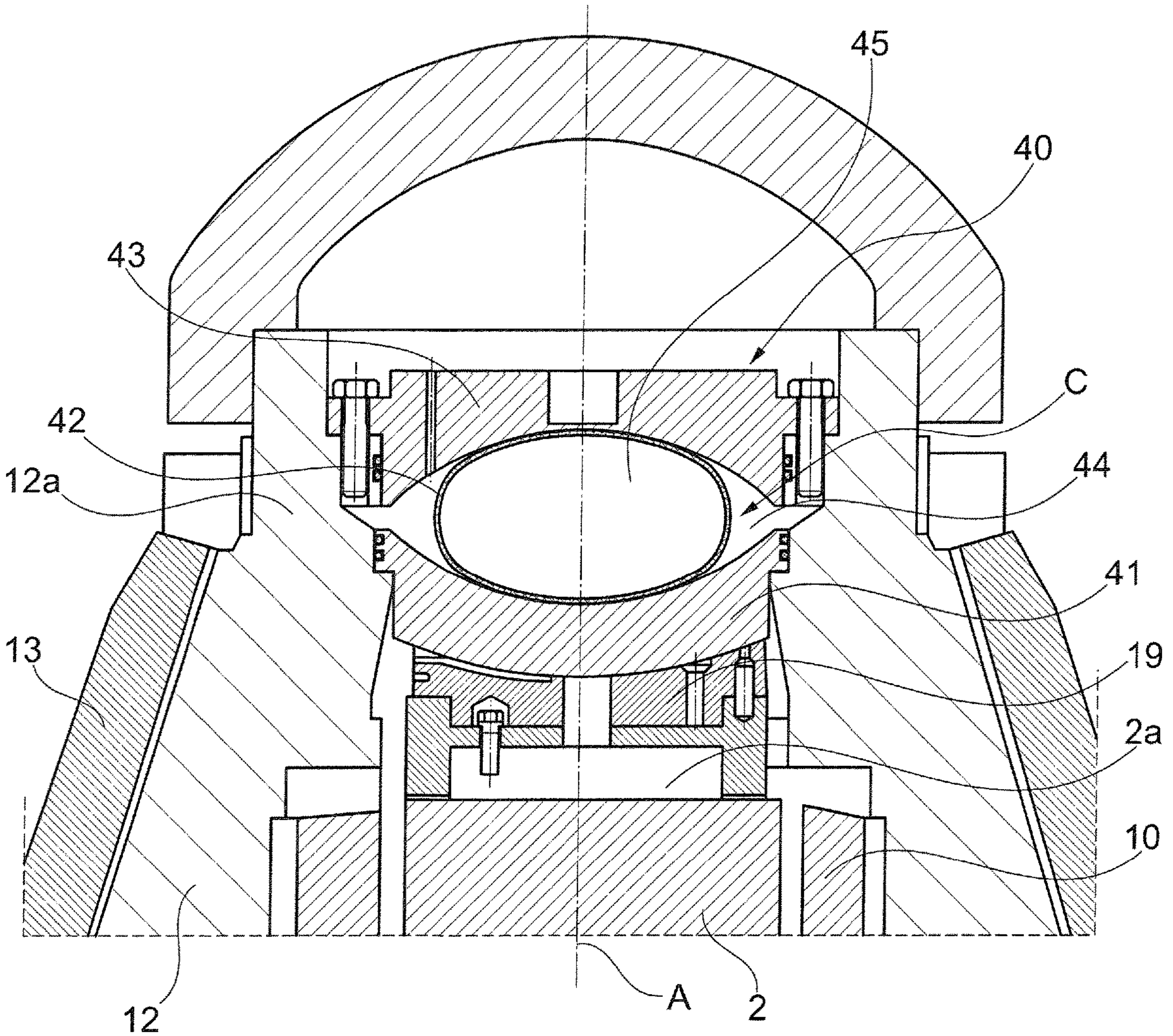
FIG. 2 shows schematically a bladder accumulator-type overload safety device according to the present invention.

FIG. 2 schematically illustrates a bladder accumulator overload safety device 40 according to the present invention. The bladder accumulator overload safety device 40 comprises a joint 41 which is rotatably received in the free upper end bearing 19. The bladder accumulator overload safety device 40 comprises a top element 43 and a bladder 42 disposed between the joint 41 and the top element 43.

The top element 43 of the overload safety device 40 is affixed to the extended part 12*a* of the crusher head 12 such that movement of the crusher head 12 in the first direction results in a corresponding movement of the top element 43 in the first direction. The extended part 12*a* of the crusher head 12 is slidable relative to the joint 41. The extended part 12*a*, joint 41 and top element 43 cooperate to define a cavity C which contains a liquid 44 which surrounds the bladder 42. The joint 41 and top element 43 are movable relative to each other such that the volume of the cavity C can be increased or decreased. A reduction in the volume of the cavity C results in the liquid 44 compressing the bladder 42. Compression of the bladder 42 results in a compression of a gas 45 contained in the bladder 42 which thereby acts to bias the top element 43 away from the joint 41.

Displacement of the crusher head 12 towards the shaft 2 results in the displacement of the top element 43 towards the joint 41. This results in a reduction of the volume of the cavity C. The reduction of the volume of the cavity C imparts pressure on at least the liquid 44 which acts to compress the bladder 42 and the gas 45. The bladder 42 containing the gas 45 acts as the biasing device to bias the crusher head 12 away from the shaft 2.

Figure 3:
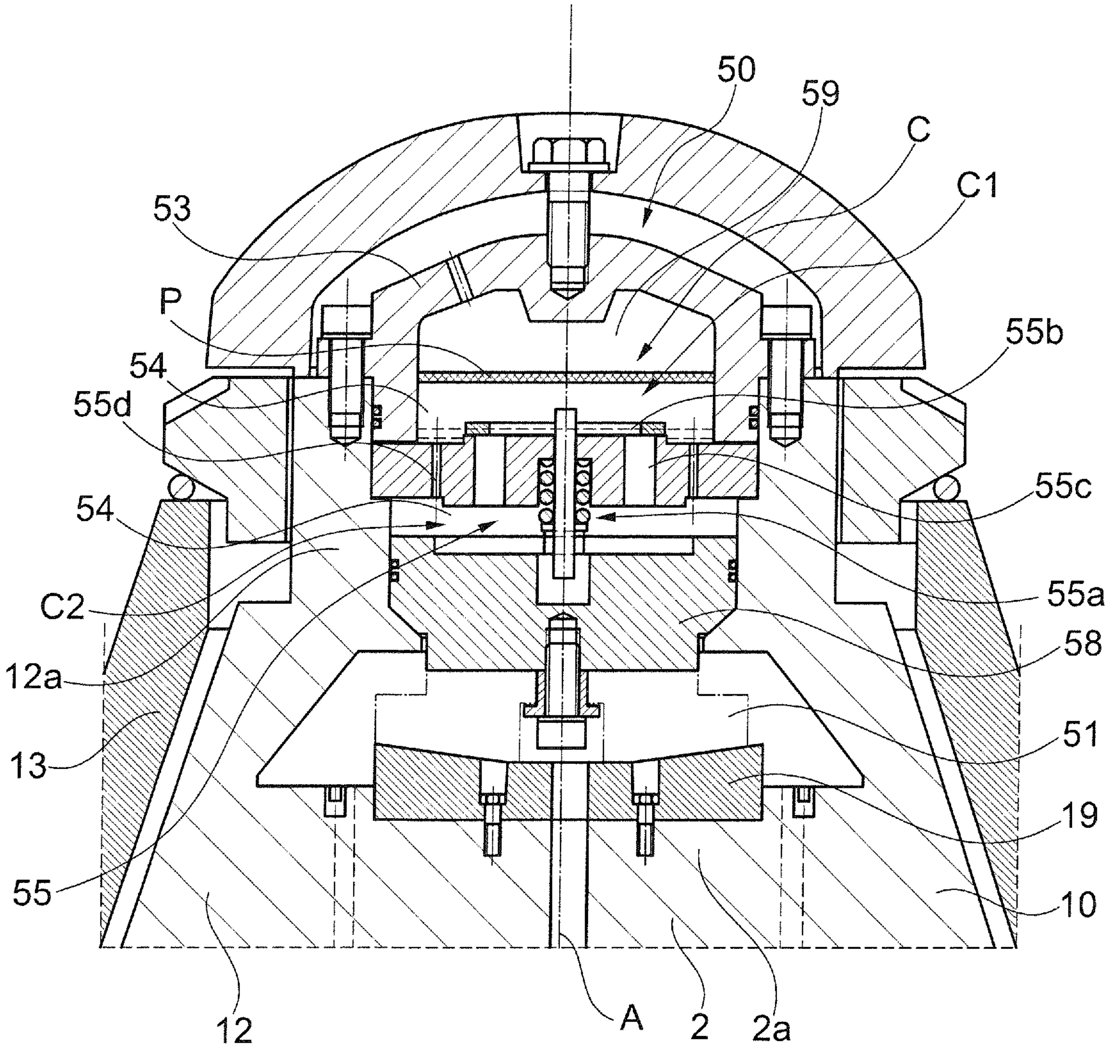
FIG. 3 shows schematically a piston accumulator overload safety device according to the present invention.

FIG. 3 schematically illustrates a piston accumulator overload safety device 50 according to the present invention. The piston accumulator overload safety device 50 comprises a joint 51 which is rotatably received in the free upper end bearing 19. The piston accumulator overload safety device 50 comprises a bottom element 58 affixed to the joint 51. In the piston accumulator overload safety device 50 the top element is a chamber element 53. A piston P is slidably disposed within the chamber element 53. A gas 59 is contained within a cavity C defined between the chamber element 53 and the piston P. The piston P may slide relative to the chamber element 53 to thereby compress the gas 59. A valve assembly 55 is attached to the chamber element 53. The chamber element 53, piston P and valve assembly 55 cooperate to define a first chamber C1 therebetween. The extended part 12*a*, valve assembly 55 and bottom element 58 cooperate to define a second chamber C2 therebetween. The first chamber C1 and second chamber C2 are configured to contain a liquid 54.

The valve assembly 55 allows the liquid 54 to flow from the first chamber C1 to the second chamber C2 and vice versa. The valve assembly 55 comprises at least one low resistance port 55*c* and at least one high resistance port 55*d*. The low resistance port 55*c* has a lower fluid resistance than a fluid resistance of the high resistance port 55*d* for fluid 54 flowing through the ports. The ports 55*c* and 55*d* allow liquid 54 to flow from the first chamber C1 to the second chamber C2 and vice versa. The valve assembly 55 further comprises a valve which includes a spring 55*a* and a sealing member 55*b*. The sealing member 55*b* is disposed within the first chamber C1 and is biased by spring 55*a* towards the low resistance port 55*c* so as to seal the low resistance port 55*c*. Such a configuration allows liquid 54 to flow from the second chamber C2 to the first chamber C1 with low fluid resistance but provides a high fluid resistance to flow from the first chamber C1 to the second chamber C2.

A force on the crusher head 12 in the first direction towards the shaft 2 results in the movement of the chamber element 53 towards the bottom element 58. Movement of the chamber element 53 towards the bottom element 58 results in the liquid 54 contained in the second chamber C2 to flow with a low resistance into the first chamber C1 via the valve assembly 55. In this direction of flow the valve in the valve assembly is open such that liquid 54 can flow through the low resistance port 55*c*. Increased pressure in the first chamber C1 due to the flow of the liquid 54 results in the displacement of the piston P such that gas 59 contained in the cavity C is compressed due to the reduction in the volume of the cavity C. This compression of the gas 59 contained in the cavity C results in a biasing force which acts to bias the crusher head 12 away from the shaft 2.

Once the force is removed from the crusher head 12, pressure in the cavity C results in the displacement of the piston P such that the volume of the cavity C increases and the volume of the first chamber C1 decreases. A decrease in the volume of the first chamber C1 results in the fluid 54 flowing with a high resistance from the first chamber C1 to the second chamber C2 via the valve assembly 55. In this direction of flow the valve in the valve assembly is closed such that liquid 54 does not flow through the low resistance port 55*c* but can only flow through the high resistance port 55*d*. This results in the overload safety device 50 slowly returning to an equilibrium configuration. This overload safety device 50 thereby provides for a soft return of the crusher head 12 from a displaced position.

Figure 4:
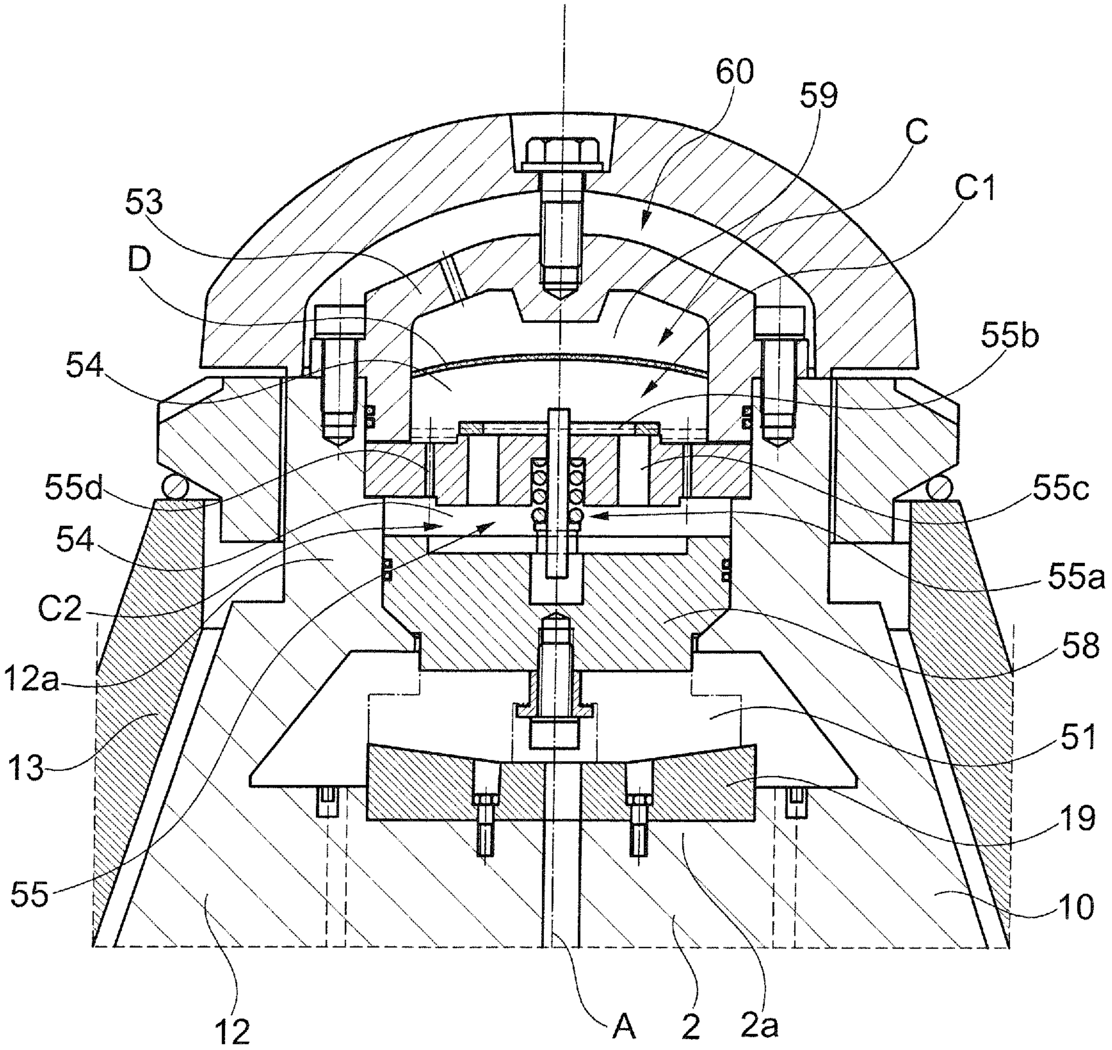
FIG. 4 shows schematically a diaphragm accumulator overload safety device according to the present invention.

FIG. 4 schematically illustrates a diaphragm accumulator overload safety device 60 according to the present invention. The diaphragm accumulator overload safety device 60 is substantially similar to the piston accumulator overload safety device 50, however the piston P is replaced with a diaphragm D. A perimeter of the diaphragm D is fixed to the chamber element 53 such that pressure in the first chamber C1 deforms the diaphragm D away from the valve assembly. FIG. 4 shows the diaphragm D in a deformed configuration.

The invention is not restricted to the above embodiments.

For example, the above embodiments describe a specific configuration in which the overload safety device is connected to a crusher device. However, the overload safety device merely has to couple the crusher head 12 to the upper shaft end 2*a* such that it permits displacement of the crusher head 12 along the first direction.

Furthermore, the crushers described above and illustrated in the drawings have the crusher head 12 journalled to the eccentric outer surface of the eccentric 10, 11, whereas the shaft 2 extends along the main axis A of the crusher, so that the eccentric rotates about the shaft 2 and applies a gyratory movement to the crusher head 12. The present invention is, however, equally applicable to crushers which have the crusher head journalled to the shaft which in turn is journalled to an eccentric inner surface of the eccentric, so that the gyratory movement is applied to the shaft.

While the embodiments described above relate to a stationary crusher, the solution according to the present invention is also applicable to mobile crushing plants. The provision of the overload safety system of the present invention will reduce impact peaks induced by the falling of the rocks and the crushing operation on the support frame. This can be particularly advantageous for mobile equipment which has a less rigid support than a stationary crusher.

We claim:

1. A crusher device comprising:

a shaft defining a first direction parallel to its length, the shaft comprising an upper shaft end;

a bearing provided at the upper shaft end;

a crusher head supported on the bearing at the upper shaft end; and an overload safety device positioned between the bearing and the crusher head to support the crusher head on the bearing and couple the crusher head to the upper shaft end, the overload safety device including a chamber element mounted to the crusher head and a biasing device positioned between the bearing and the crusher head and configured to bias the crusher head away from the upper shaft end in the first direction, wherein:

the overload safety device is configured to permit displacement of the crusher head in a second direction opposite the first direction relative to the shaft from an equilibrium position to a displaced position in response to a force acting on the crusher head in the second direction, wherein the biasing device is configured to return the crusher head from the displaced position to the equilibrium position upon removal of the force;

wherein the biasing device is a piston diaphragm accumulator comprising:

a gas chamber located within the chamber element;

a first liquid chamber located within the chamber element;

a second liquid chamber in fluid communication with the first liquid chamber; and a perimeter of the diaphragm fixed within the chamber element between the gas chamber and the first liquid chamber such that the gas chamber is defined by the chamber element and the movable diaphragm and the first liquid chamber is defined by the movable diaphragm and the chamber element;

wherein the gas chamber is configured to hold a pressurized gas such that the gas chamber and the pressurized gas are compressible by deformation of the diaphragm in the first direction;

wherein the first liquid chamber is configured to hold a liquid such that the fluid may impart deformation of the diaphragm;

wherein the second liquid chamber is configured to hold a portion of the liquid such when the liquid in the second chamber is pressurized due to the force acting on the crusher head in the second direction, the fluid flows from the second liquid chamber into the first liquid chamber.

2. The crusher device of claim 1, wherein the overload safety device further comprises a joint received in the bearing.

3. The crusher device of claim 2, wherein the bearing is a spherical bearing, and the joint is a spherical joint.

4. The crusher device of claim 2, wherein the biasing device is disposed between the chamber element and the joint.

5. The crusher device of claim 1, further comprising a valve assembly disposed between the first liquid chamber and the second liquid chamber, wherein the valve assembly is configured to allow the liquid to flow from the second chamber to the first chamber with a lower resistance than a flow from the first chamber to the second chamber.

6. The crusher device of claim 5, wherein the valve assembly comprises:

a low resistance check valve configured to allow the liquid to flow through from the second chamber to the first chamber but not allow the liquid to flow through from the first chamber to the second chamber; and a high resistance bypass port configured to allow the liquid to flow through from the first chamber to the second chamber.

* * * * *